United States Patent
Zavesky et al.

(10) Patent No.: US 10,594,569 B2
(45) Date of Patent: *Mar. 17, 2020

(54) CONTENT QUALITY ASSESSMENT AND PREDICTION VIA FLOWS

(71) Applicant: AT&T Intellectual Property I, L.P., Atlanta, GA (US)

(72) Inventors: Eric Zavesky, Austin, TX (US); Lee Begeja, Gillette, NJ (US); David Crawford Gibbon, Lincroft, NJ (US); Raghuraman Gopalan, Dublin, CA (US); Zhu Liu, Marlboro, NJ (US); Yadong Mu, Middletown, NJ (US); Bernard S. Renger, New Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/171,851

(22) Filed: Oct. 26, 2018

(65) Prior Publication Data

US 2019/0075029 A1 Mar. 7, 2019

Related U.S. Application Data

(63) Continuation of application No. 15/176,544, filed on Jun. 8, 2016, now Pat. No. 10,142,185.

(51) Int. Cl.
*H04L 12/26* (2006.01)
*H04L 12/24* (2006.01)
*H04L 12/851* (2013.01)

(52) U.S. Cl.
CPC .......... *H04L 41/142* (2013.01); *H04L 41/147* (2013.01); *H04L 43/026* (2013.01); *H04L 47/24* (2013.01); *Y02D 50/30* (2018.01)

(58) Field of Classification Search
CPC ..... H04L 41/142; H04L 43/026; H04L 47/24; H04L 41/147; Y02D 50/30
See application file for complete search history.

(56) References Cited

U.S. PATENT DOCUMENTS

| 7,613,105 B2 | 11/2009 | Bahl et al. |
| 8,027,245 B2 | 9/2011 | Kodialam et al. |

(Continued)

OTHER PUBLICATIONS

Kompella, Ramana Rao, "Fault localization in backbone networks", 2007.

*Primary Examiner* — Kim T Nguyen
(74) *Attorney, Agent, or Firm* — Guntin & Gust, PLC; Jay Anderson

(57) ABSTRACT

Aspects of the subject disclosure may include, for example, analyzing content flow data in a communication network to obtain flow statistics; the statistics are aggregated to construct a model of the content flow based on the aggregated flow statistics. Operations of network nodes are predicted based on the model; a content delivery path in the communication network is identified. A quality of service is detected for network nodes on the content delivery path. The detected quality of service is compared with a predicted quality of service based on the model; a network anomaly is detected based on the comparing. The content flow on the content delivery path is adjusted responsive to detection of the network anomaly. Other embodiments are disclosed.

20 Claims, 10 Drawing Sheets

(56) References Cited

U.S. PATENT DOCUMENTS

| | | | |
|---|---|---|---|
| 8,149,718 B2 | 4/2012 | Marilly et al. | |
| 8,175,223 B2 | 5/2012 | Narayanan et al. | |
| 8,937,856 B2 | 1/2015 | Taylor et al. | |
| 9,059,939 B2 | 6/2015 | Garimella | |
| 9,094,257 B2 | 7/2015 | Morrill | |
| 9,104,543 B1 | 8/2015 | Cavanagh | |
| 9,210,038 B1 | 12/2015 | Rauser | |
| 9,253,027 B2 | 2/2016 | Vaidya | |
| 10,142,185 B2 * | 11/2018 | Zavesky | H04L 41/142 |
| 2002/0097673 A1 | 7/2002 | Suzuki et al. | |
| 2015/0163091 A1 | 6/2015 | Thubert | |
| 2016/0080965 A1 | 3/2016 | Boyle | |
| 2017/0149637 A1 * | 5/2017 | Banikazemi | H04L 43/08 |
| 2017/0279837 A1 * | 9/2017 | Dasgupta | H04L 45/00 |
| 2017/0359242 A1 | 12/2017 | Zavesky et al. | |

* cited by examiner

100

200

300

CONTENT QUALITY ASSESSMENT AND PREDICTION VIA FLOWS

CROSS REFERENCE TO RELATED APPLICATIONS

This application is a continuation of U.S. application Ser. No. 15/176,544, filed on Jun. 8, 2016, which is incorporated herein by reference in its entirety.

FIELD OF THE DISCLOSURE

The subject disclosure relates to delivering content over a network, and more particularly to a system and method for assessing and predicting content delivery quality.

BACKGROUND

The expansion of content delivery networks (CDNs), including encrypted content channels (for example, HTTPS, HLS, etc.) has introduced challenges in assuring service quality. One conventional approach is Deep Packet Inspection (DPI), which involves examining packet data as it passes an inspection point on a network.

BRIEF DESCRIPTION OF THE DRAWINGS

Reference will now be made to the accompanying drawings, which are not necessarily drawn to scale, and wherein.

DETAILED DESCRIPTION

Figure 1:
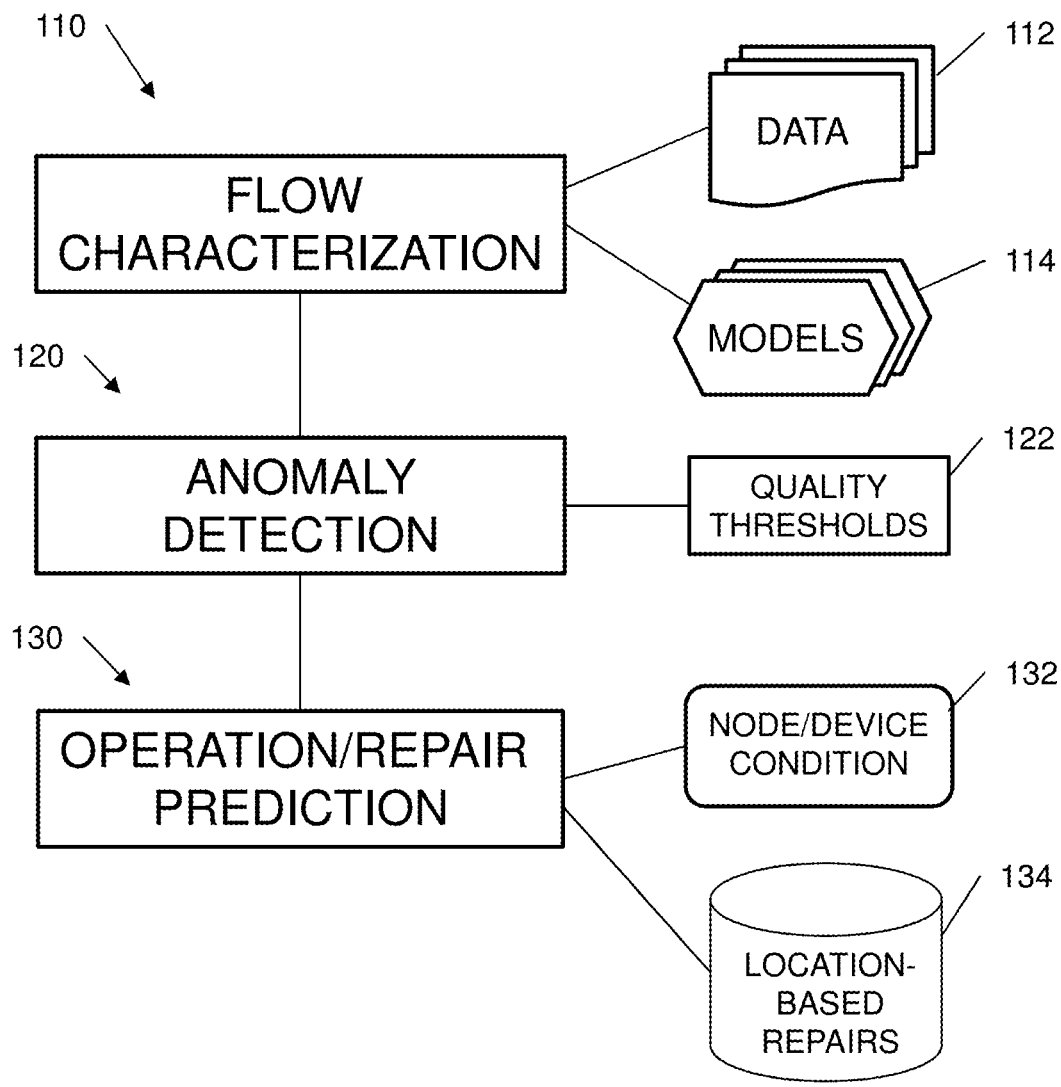
FIG. 1 schematically illustrates methods for assessing and predicting quality of service on a network, according to embodiments of the disclosure.

The subject disclosure describes, among other things, illustrative embodiments for assessing and predicting quality of content flow on a network, using flow models for network devices and services. Other embodiments are described in the subject disclosure.

One or more aspects of the subject disclosure include a method comprising analyzing, by a processing system including a processor, data regarding a content flow in a communication network to obtain flow statistics; the communication network comprises a plurality of nodes including devices, edge nodes, and service providers. The method also comprises aggregating, by the processing system, the flow statistics; constructing, by the processing system, a model of the content flow based on the aggregated flow statistics; predicting, by the processing system, operations of network nodes based on the model; and identifying, by the processing system, a content delivery path in the communication network. The method further comprises detecting, by the processing system, a quality of service for each of a plurality of locations on the content delivery path; comparing, by the processing system, the detected quality of service with a predicted quality of service based on the model; detecting, by the processing system, a network anomaly based on the comparing; and adjusting, by the processing system, the content flow on the content delivery path responsive to detection of the network anomaly.

One or more aspects of the subject disclosure include a processing system including a processor and a memory that stores executable instructions that, when executed by the processing system, facilitate performance of operations. The operations comprise obtaining data regarding a content flow in a communication network by logging the content flow at a network component; the communication network comprises a plurality of nodes including devices, edge nodes, and service providers, and the network component comprises a router, a switch, a server, or a combination thereof. The operations also comprise analyzing the data to obtain flow statistics; aggregating the flow statistics; and constructing a model of the content flow based on the aggregated flow statistics. The operations further comprise predicting operations of network nodes based on the model; and identifying a content delivery path in the communication network. The operations also comprise detecting a quality of service for each of a plurality of locations on the content delivery path; comparing the detected quality of service with a predicted quality of service based on the model; detecting a network anomaly based on the comparing; and initiating a self-healing process for the network, responsive to detecting the network anomaly.

One or more aspects of the subject disclosure include a machine-readable storage medium comprising executable instructions that, when executed by a processing system including a processor, facilitate performance of operations comprising obtaining data regarding a content flow in a communication network by logging the content flow at a network component; the communication network comprises a plurality of nodes including devices, edge nodes, and service providers, and the network component comprises a router, a switch, a server, or a combination thereof. The operations also comprise analyzing the data to obtain flow statistics; aggregating the flow statistics; and constructing a model of the content flow based on the aggregated flow statistics. The operations further comprise predicting operations of network nodes based on the model; identifying a content delivery path in the communication network; and detecting a quality of service for each of a plurality of locations on the content delivery path. The operations also comprise comparing the detected quality of service with a predicted quality of service based on the model; detecting a network anomaly based on the comparing; initiating a self-healing process for the network, responsive to detecting the network anomaly; and evaluating a network health condition based on the quality of service for each of the plurality of locations on the content delivery path.

FIG. 1 schematically illustrates a method 100 for evaluating and predicting service flow quality on a network, according to embodiments of the disclosure. Method 100 includes processes for characterization 110 of traffic flows on the network; detection 120 of anomalies in quality of service on the network; and prediction 130 of operations and repairs of network components. In embodiments of the disclosure, data 112 regarding traffic flows on the network is used to characterize devices (e.g. user devices) at network endpoints, equipment (e.g. communications towers) at network edges, and services (e.g. provision of content). In particular embodiments, characterization 110 is performed by large-scale aggregation of flow statistics. This permits construction of models 114 to describe network flows and to predict operation of various network devices.

The characterized flow information also facilitates formulation of quality thresholds 122 for any point on the network, permitting detection of a service anomaly (degradation in service quality) throughout the network. A system implementing method 100 can dynamically learn and adjust traffic for an endpoint device, an edge node, or a service. Furthermore, in an embodiment, a model can be shared between networks (after the flow data for a node, device or network has been collected, recorded and aggregated); in particular, the model can be shared for research or security purposes. In this embodiment, the owner of the network with whom the model is shared can learn about the performance of his network and potential security threats to his network. In this embodiment, model sharing between networks may be done anonymously.

Using the characterized flow information, a system implementing this method can create operation and repair predictions for nodes within the network or for devices that utilize a service. In addition to the characterized flows and models, the system can also gather information 132 regarding the physical condition of a device. The system can then build a database 134 of possible repairs to suggest for devices at various locations.

Figure 2:
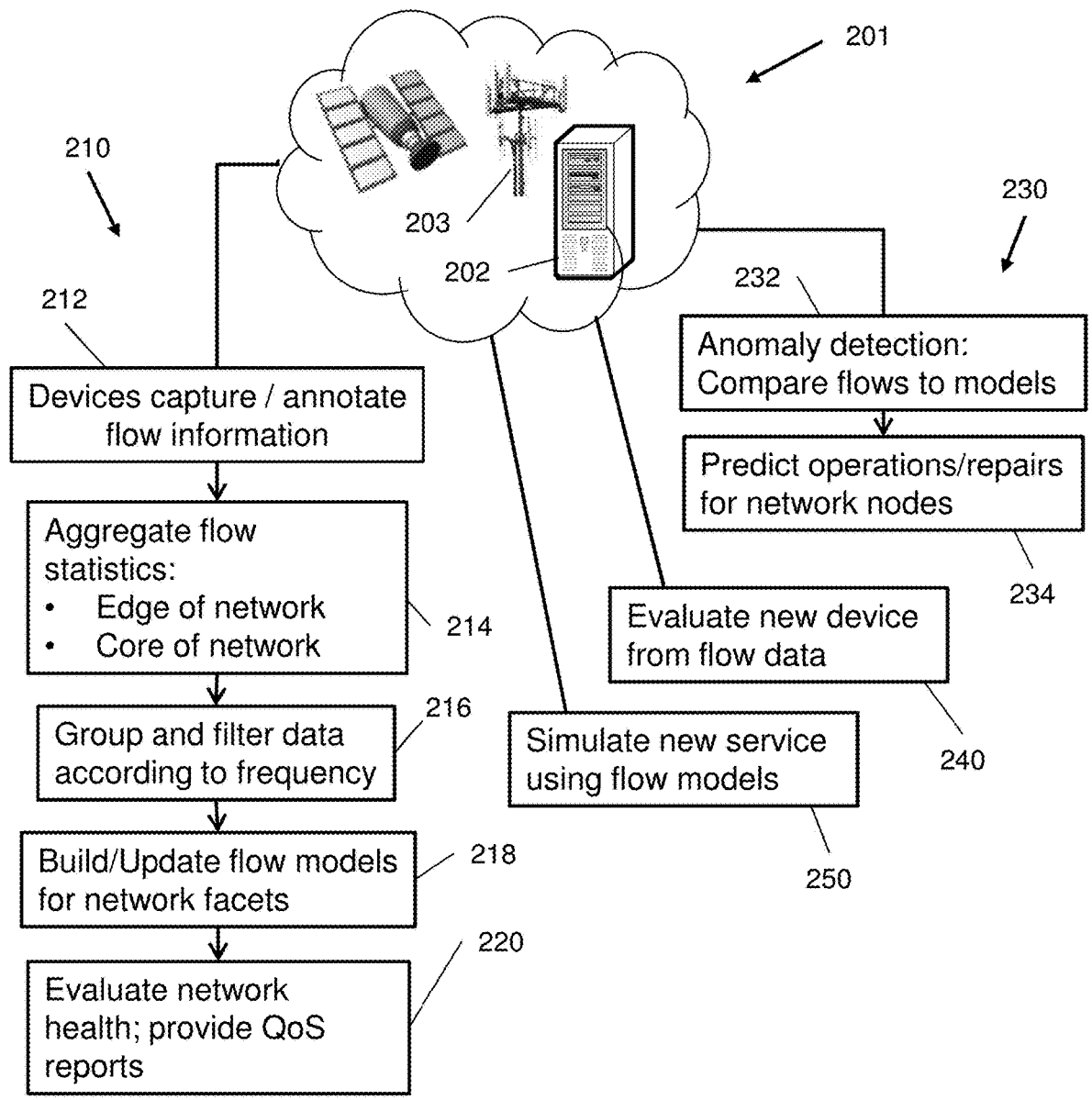
FIG. 2 schematically illustrates a system implementing the methods of FIG. 1, in accordance with an embodiment of the disclosure.

FIG. 2 depicts an illustrative embodiment of a system 200 implementing the methods of FIG. 1. As shown schematically in FIG. 2, network 201 can include a wide variety of devices, generally including Internet-capable communication devices and various devices for delivering content. In particular, network 201 can include server 202 as a core component and tower 203 as an edge component.

In the characterization process 210 of this embodiment, network elements (e.g. routers, switches and servers) are configured to capture flow information 212. In this embodiment, flow on a content data path can be characterized in terms of a byte count of content being delivered over the data path per unit time; a flow value thus might be given as a number of bytes associated with two time stamps (that is, the number of bytes delivered during an interval beginning and ending at the respective timestamps). In this embodiment, a more complete characterization of flow also includes information regarding the content source, the network edge, and the client (destination of the content). Aggregation 214 of flow statistics is performed for locations at the edge of the network and at the core of the network. Flow data is grouped and filtered 216 according to frequency, so that data on infrequently occurring flows is discarded. The system can build or update models 218 for various network facets (locations, applications or services having statistics associated with them).

In an embodiment, the system also evaluates 220 the overall health of the network to provide quality of service (QoS) reports. In an embodiment, a network health report includes past and present performance deviations and identifies parts of the network or network services that are acting as network stressors.

In the anomaly detection process 230 of this embodiment, flows are compared 232 to known models. In an embodiment, the system can predict 234 possible repairs for network nodes to address service anomalies.

In the prediction process of this embodiment, the system can use flow data to evaluate 240 a new device or service. In an embodiment, the system can also simulate 250 a new service using network flow models developed previously.

Figure 3:
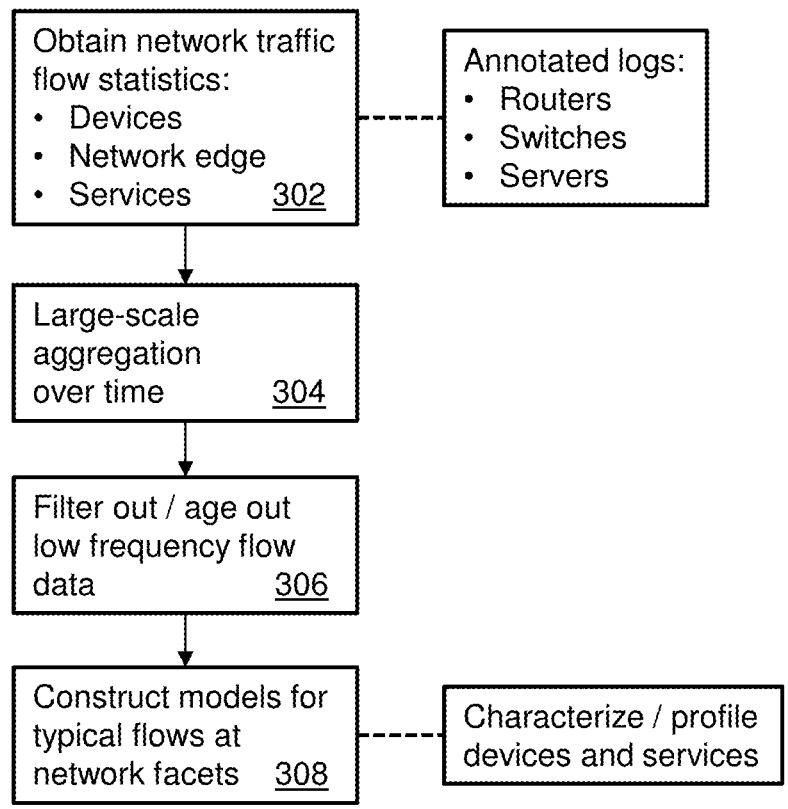
FIG. 3 depicts an illustrative embodiment of a procedure for characterization of content and services delivered on a network.

FIG. 3 depicts an illustrative embodiment of a flow characterization procedure 300 used for network 201. In step 302, network traffic flow statistics are obtained. In an embodiment, this is done by logging network flows (e.g. byte counts of content handled by a device); this information is annotated with identifiers for the device, edge node, or content source. In step 304, large-scale aggregation of the flow statistics is performed over time. In step 306, data for flows with low frequency at a given source, edge node, or device is discarded after a set period of time (aging out infrequently occurring flows).

Models for typical flows are then constructed (step 308) using the aggregated flow statistics. A generalized model for normal operation of the network may then be constructed. In specific embodiments, models for particular devices and services can be formulated, to assess the health of portions of the network and to detect service anomalies at different locations. In an embodiment, a model is formulated for each facet of the network.

Figure 4:
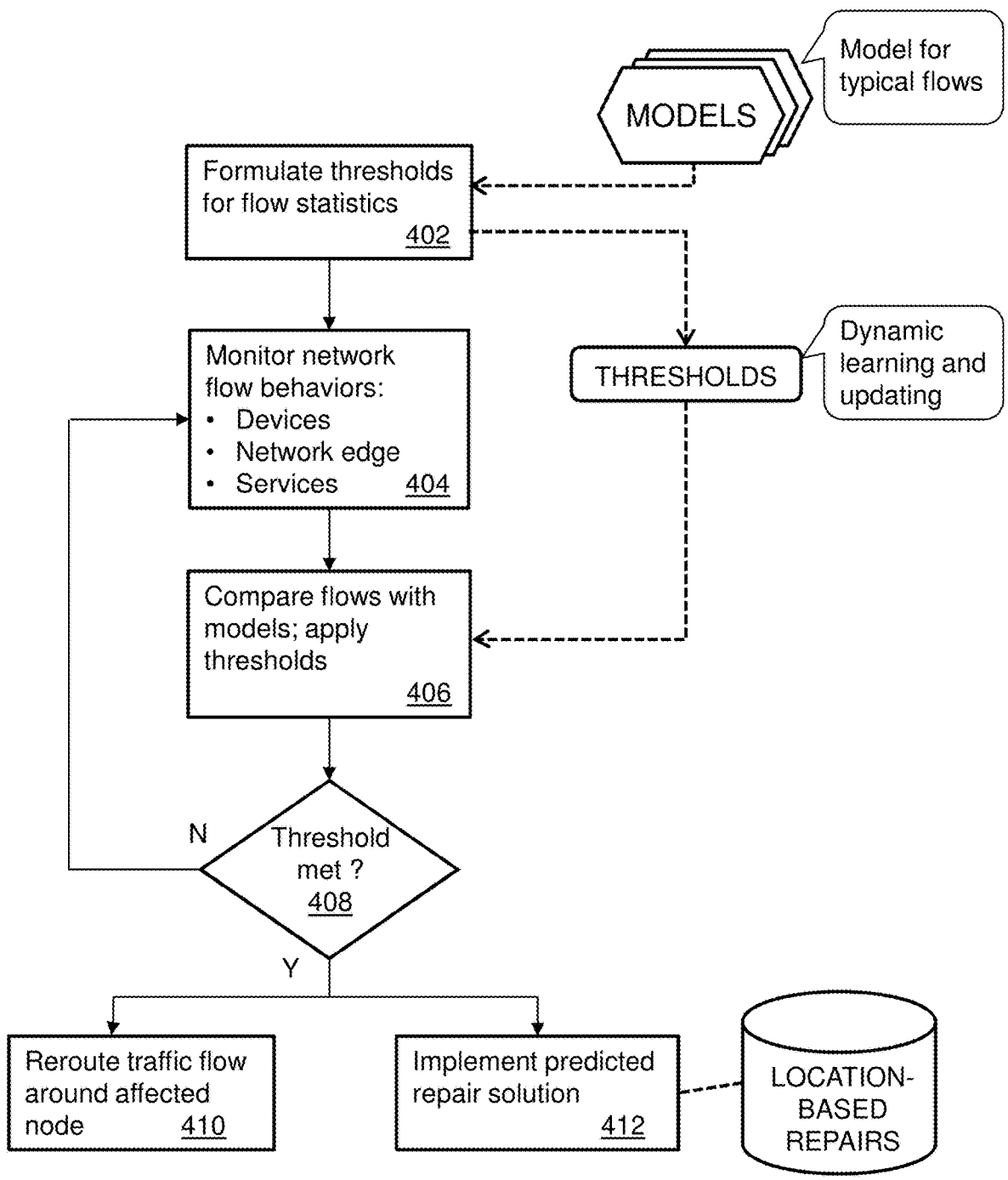
FIG. 4 depicts an illustrative embodiment of a procedure for detecting anomalies in delivery of content and services on a network.

FIG. 4 depicts an illustrative embodiment of an anomaly detection procedure 400 using the models generated in procedure 300. In step 402, thresholds are formulated to define acceptable quality of service levels. These thresholds can be adjusted over time, according to network experience (dynamic thresholding). Alternatively, a threshold may be predetermined as a level of a selected network metric.

In step 404, various devices, edge locations, and services are monitored to determine traffic flow behavior. In step 406, these flow behaviors are compared with the applicable models; the thresholds are used to determine whether an anomaly is occurring.

If it is determined (step 408) that a threshold has been met (that is, flow behavior is outside a normal range), procedures for correcting a service anomaly are initiated. In an embodiment, the anomaly is detected at a network node and the system reroutes traffic flow around the node (step 410). In another embodiment, a predicted repair solution (previously stored in the location-based repair database) is implemented for the affected node (step 412).

Figure 5:
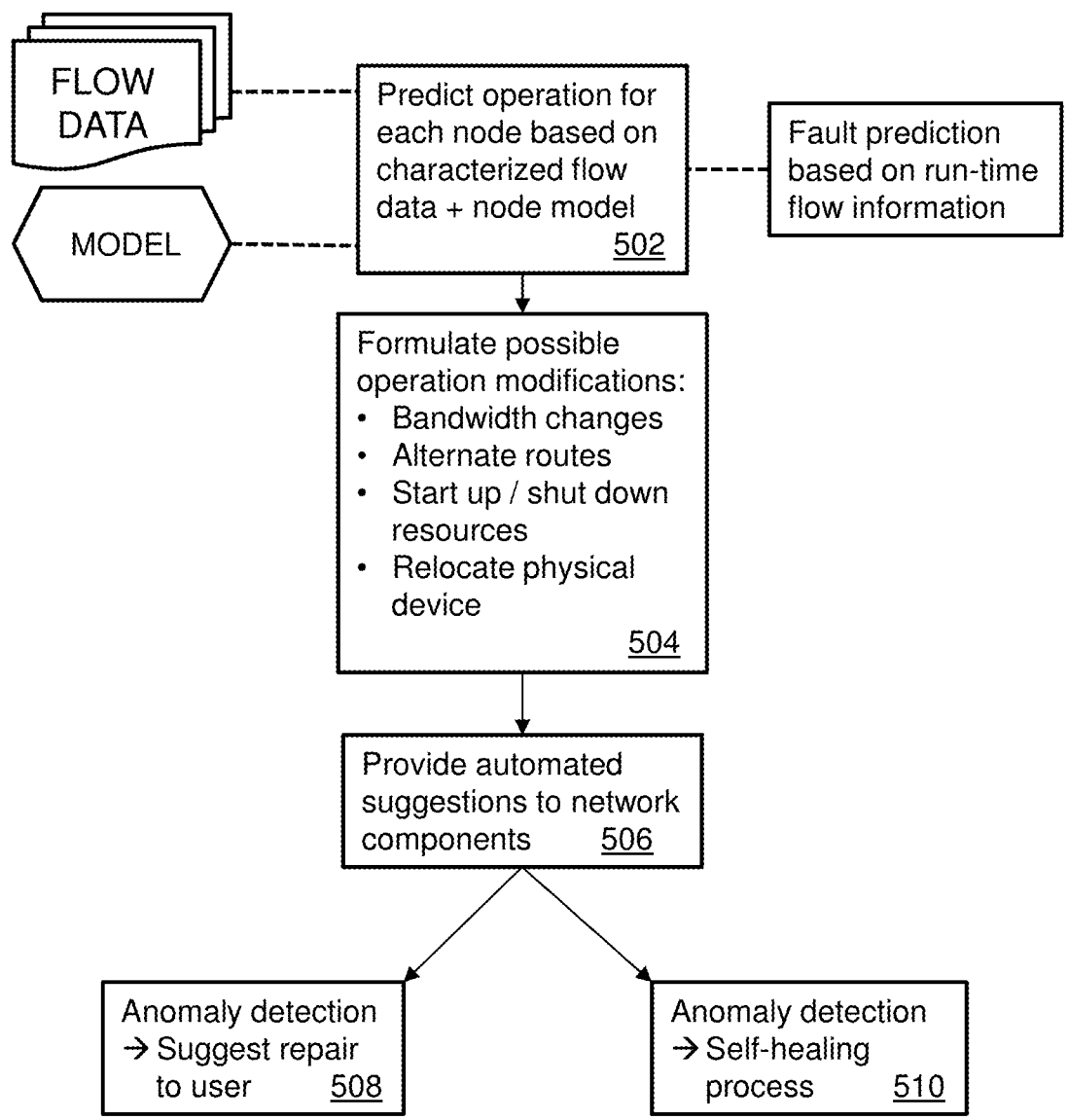
FIG. 5 depicts an illustrative embodiment of a procedure for operation and repair predictions for nodes within the network or devices that utilize a service.

FIG. 5 depicts an illustrative embodiment of an operation and repair prediction procedure 500 for the network, performed by a system such as system 200. The operation of each network node can be predicted based on the model for that node and the flow data relating to the node (step 502). In particular, run-time flow information can be applied to the model to predict faults in operation. The system can formulate possible modifications to operations (step 504) to respond to fault conditions or to dynamically improve quality of service (in accordance with the network QoS health assessment performed by the system). These modifications can include bandwidth changes, alternate IP routes, or the start-up (or shutdown) of other resources. These operation modifications can be automated (for example, within the network core or a service provided over the network) or directly applied to a client (step 506). A repair prediction can also include information regarding the physical condition or location of a device. In an embodiment, the system may suggest to a user that a client device be relocated to obtain greater bandwidth.

In an embodiment, a suggested repair for a network location involves flows for both a node at that location and the service handled or provided by the node. More generally, pairing of service and node flows permits more effective service improvements than a suggestion relating to the node by itself. In another embodiment, the system can use flow profiling and device profiling to identify redundant paths (that is, paths with identical byte count/time interval/source/ edge/client signatures) or unused paths, and then route those paths to obtain better network performance and/or derive more revenue.

In an embodiment, detection of a network anomaly causes the system to alert a user and suggest a repair to the user (step 508). Alternatively, the system can initialize a self-healing process (step 510) that includes suggested operation modifications. For example, the system can restart a service to avoid or mitigate a suspected denial-of-service attack. In particular embodiments, such suggestions can be applied to any portion and any level of the network, including end nodes (that is, user devices).

Figure 6:
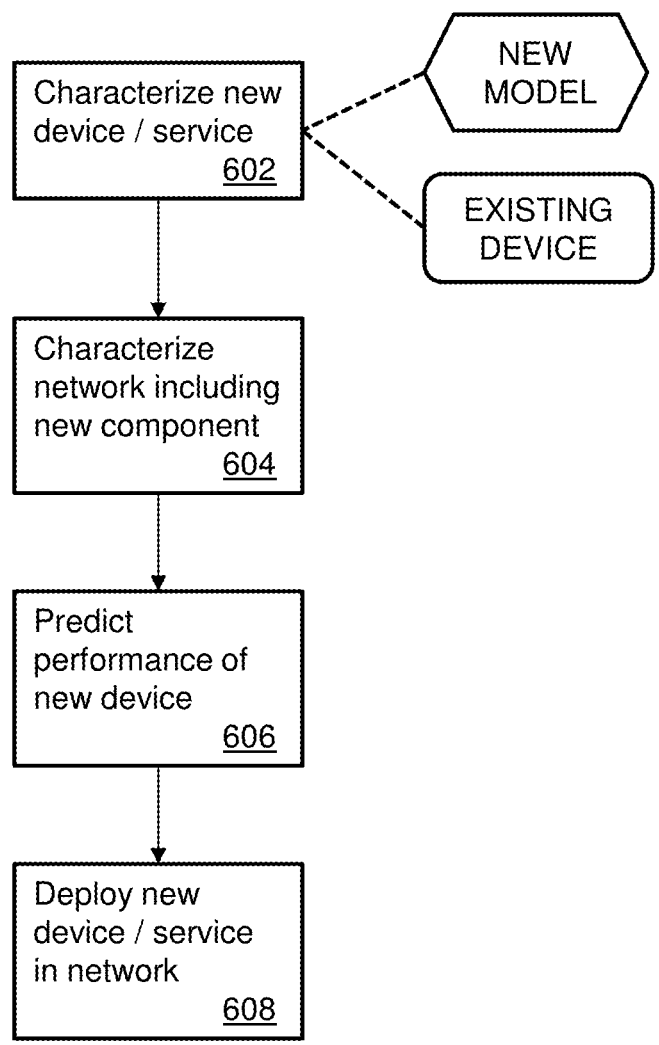
FIG. 6 depicts an illustrative embodiment of a procedure for testing a new network component (device or service) before deployment on a network.

FIG. 6 depicts an illustrative embodiment of a procedure 600 for evaluating a new device or service prior to its being deployed on the network. In step 602, operation of the new device or service is characterized based on either a newly constructed model or characterizations of existing similar components. In step 604, the network can be characterized with the new component included; this permits prediction of performance of the new component (step 606). The new device or service can then be deployed on the network (step 608) with its own set of operation and repair predictions. It will be appreciated that the term "device" does not necessarily refer to a physical item connected in the network.

While for purposes of simplicity of explanation, the respective processes are shown and described as a series of blocks in FIGS. 3-6, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In addition, it will be appreciated that the system can provide dynamic profiling of the network at a resource level (e.g. network node, network edge, client device, etc.) for early detection of faults, rather than passively monitoring performance at a service level.

Furthermore, analysis and modeling of network components based on flows permits characterization and prediction of network operation independent of the type of content delivered by the network. In particular, the methods described herein can be applied independent of the type of encryption layers that may surround the content.

Figure 7:
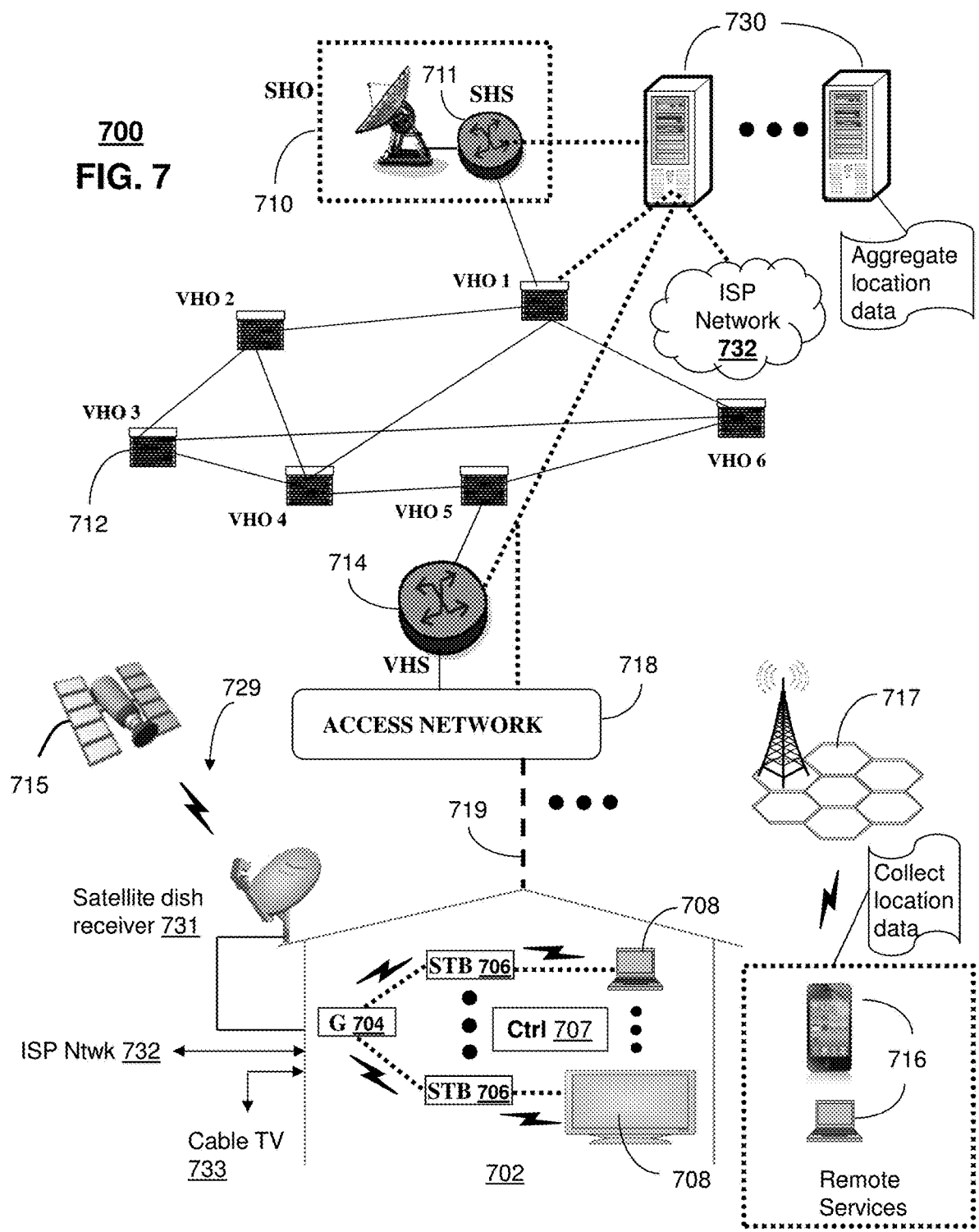
FIGS. 7-8 depict illustrative embodiments of communication systems that provide media services in the system of FIG. 2.

FIG. 7 depicts an illustrative embodiment of a first communication system 700 for delivering media content. The communication system 700 can represent an Internet Protocol Television (IPTV) media system. Communication system 700 can be overlaid or operably coupled with system 100 of FIG. 1 as another representative embodiment of communication system 700. For instance, one or more devices illustrated in the communication system 700 of FIG. 7 can comprise a processing system including a processor and a memory that stores executable instructions that, when executed by the processing system, facilitate performance of operations. The operations can comprise obtaining data regarding a content flow in a communication network by logging the content flow at a network component; the communication network comprises a plurality of nodes including devices, edge nodes, and service providers, and the network component comprises a router, a switch, a server, or a combination thereof. The operations can also comprise analyzing the data to obtain flow statistics; aggregating the flow statistics; and constructing a model of the content flow based on the aggregated flow statistics. The operations can further comprise predicting operations of network nodes based on the model; and identifying a content delivery path in the communication network. The operations can also comprise detecting a quality of service for each of a plurality of locations on the content delivery path; comparing the detected quality of service with a predicted quality of service based on the model; detecting a network anomaly based on the comparing; and initiating a self-healing process for the network, responsive to detecting the network anomaly.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services. System 700 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for all or a portion of the computing devices 730 to function as a navigation server (herein referred to as server 730). The server 730 can use computing and communication technology to perform data processing functions which can include, among other things, the aggregation of network flow statistics described by method 300 of FIG. 3. For instance, functions of server 730 can be similar to the functions described for server 202 of FIG. 2 in accordance with method 300. The media processors 706 and wireless communication devices 716 can be provisioned with software functions to utilize the services of server 730. For instance, functions of media processors 706 and wireless communication devices 716 can be similar to the functions described for device 101 in FIG. 1 in accordance with method 600.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
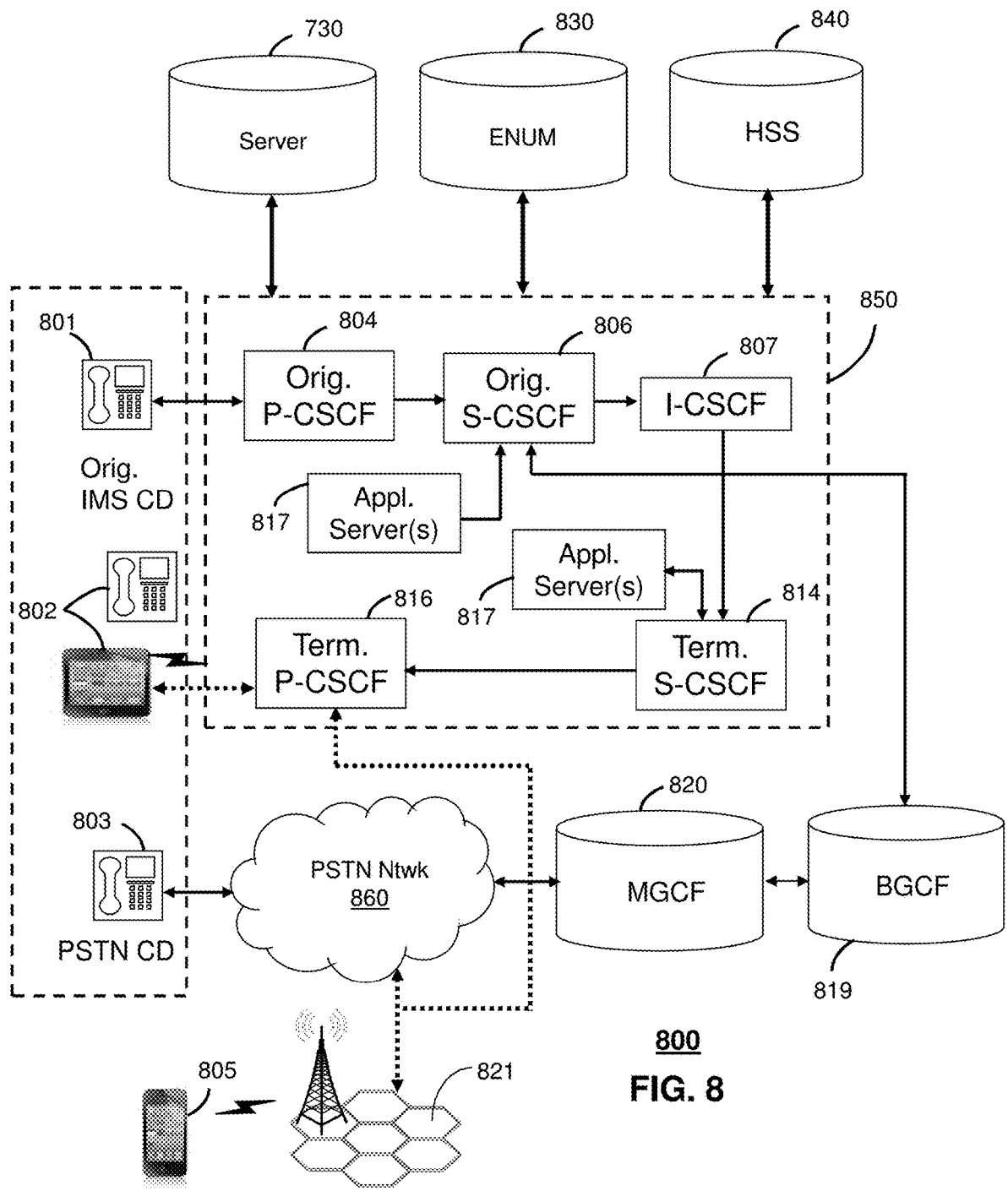

FIG. 8 depicts an illustrative embodiment of a communication system 800 employing an IP Multimedia Subsystem (IMS) network architecture to facilitate the combined services of circuit-switched and packet-switched systems. Communication system 800 can be overlaid or operably coupled with system 100 of FIG. 1 and communication system 700 as another representative embodiment of communication system 700. In particular, elements of system 700 can perform a method comprising analyzing, by a processing system including a processor, data regarding a content flow in a communication network to obtain flow statistics; the communication network comprises a plurality of nodes including devices, edge nodes, and service providers. The method can also comprise aggregating, by the processing system, the flow statistics; constructing, by the processing system, a model of the content flow based on the aggregated flow statistics; predicting, by the processing system, operations of network nodes based on the model; and identifying, by the processing system, a content delivery path in the communication network. The method can further comprise detecting, by the processing system, a quality of service for each of a plurality of locations on the content delivery path; comparing, by the processing system, the detected quality of service with a predicted quality of service based on the model; detecting, by the processing system, a network anomaly based on the comparing; and adjusting, by the processing system, the content flow on the content delivery path responsive to detection of the network anomaly.

Communication system 800 can comprise a Home Subscriber Server (HSS) 840, a tElephone NUmber Mapping (ENUM) server 830, and other network elements of an IMS network 850. The IMS network 850 can establish communications between IMS-compliant communication devices (CDs) 801, 802, Public Switched Telephone Network (PSTN) CDs 803, 805, and combinations thereof by way of a Media Gateway Control Function (MGCF) 820 coupled to a PSTN network 860. The MGCF 820 need not be used when a communication session involves IMS CD to IMS CD communications. A communication session involving at least one PSTN CD may utilize the MGCF 820.

IMS CDs 801, 802 can register with the IMS network 850 by contacting a Proxy Call Session Control Function (P-CSCF) which communicates with an interrogating CSCF (I-CSCF), which in turn, communicates with a Serving CSCF (S-CSCF) to register the CDs with the HSS 840. To initiate a communication session between CDs, an originating IMS CD 801 can submit a Session Initiation Protocol (SIP INVITE) message to an originating P-CSCF 804 which communicates with a corresponding originating S-CSCF 806. The originating S-CSCF 806 can submit the SIP INVITE message to one or more application servers (aSs) 817 that can provide a variety of services to IMS subscribers.

For example, the application servers 817 can be used to perform originating call feature treatment functions on the calling party number received by the originating S-CSCF 806 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 806 can submit queries to the ENUM system 830 to translate an E.164 telephone number in the SIP INVITE message to a SIP Uniform Resource Identifier (URI) if the terminating communication device is IMS-compliant. The SIP URI can be used by an Interrogating CSCF (I-CSCF) 807 to submit a query to the HSS 840 to identify a terminating S-CSCF 814 associated with a terminating IMS CD such as reference 802. Once identified, the I-CSCF 807 can submit the SIP INVITE message to the terminating S-CSCF 814. The terminating S-CSCF 814 can then identify a terminating P-CSCF 816 associated with the terminating CD 802. The P-CSCF 816 may then signal the CD 802 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 8 may be interchangeable. It is further noted that communication system 800 can be adapted to support video conferencing. In addition, communication system 800 can be adapted to provide the IMS CDs 801, 802 with the multimedia and Internet services of communication system 700 of FIG. 7.

If the terminating communication device is instead a PSTN CD such as CD 803 or CD 805 (in instances where the cellular phone only supports circuit-switched voice communications), the ENUM system 830 can respond with an unsuccessful address resolution which can cause the originating S-CSCF 806 to forward the call to the MGCF 820 via a Breakout Gateway Control Function (BGCF) 819. The MGCF 820 can then initiate the call to the terminating PSTN CD over the PSTN network 860 to enable the calling and called parties to engage in voice and/or data communications.

It is further appreciated that the CDs of FIG. 8 can operate as wireline or wireless devices. For example, the CDs of FIG. 8 can be communicatively coupled to a cellular base station 821, a femtocell, a WiFi router, a Digital Enhanced Cordless Telecommunications (DECT) base unit, or another suitable wireless access unit to establish communications with the IMS network 850 of FIG. 8. The cellular access base station 821 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 8.

Cellular phones supporting LTE can support packet-switched voice and packet-switched data communications and thus may operate as IMS-compliant mobile devices. In this embodiment, the cellular base station 821 may communicate directly with the IMS network 850 as shown by the arrow connecting the cellular base station 821 and the P-CSCF 816.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 730 of FIG. 7 can be operably coupled to communication system 800 for purposes similar to those described above. Server 730 can perform aggregation, modeling, and anomaly detection functions and thereby provide repair suggestions to the CDs 801, 802, 803 and 805 of FIG. 8, similar to the functions described for server 202 of FIG. 1 in accordance with methods 300-400 of FIGS. 3-4. CDs 801, 802, 803 and 805, which can be adapted with software to generate navigation directions to utilize the map generation services of the server 730, similar to the functions described for communication device 101 of FIG.1 in accordance with method 600 of FIG. 6. Server 730 can be an integral part of the application server(s) 817 performing indexing, aggregating and map generation which can be adapted to the operations of the IMS network 850.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 9:
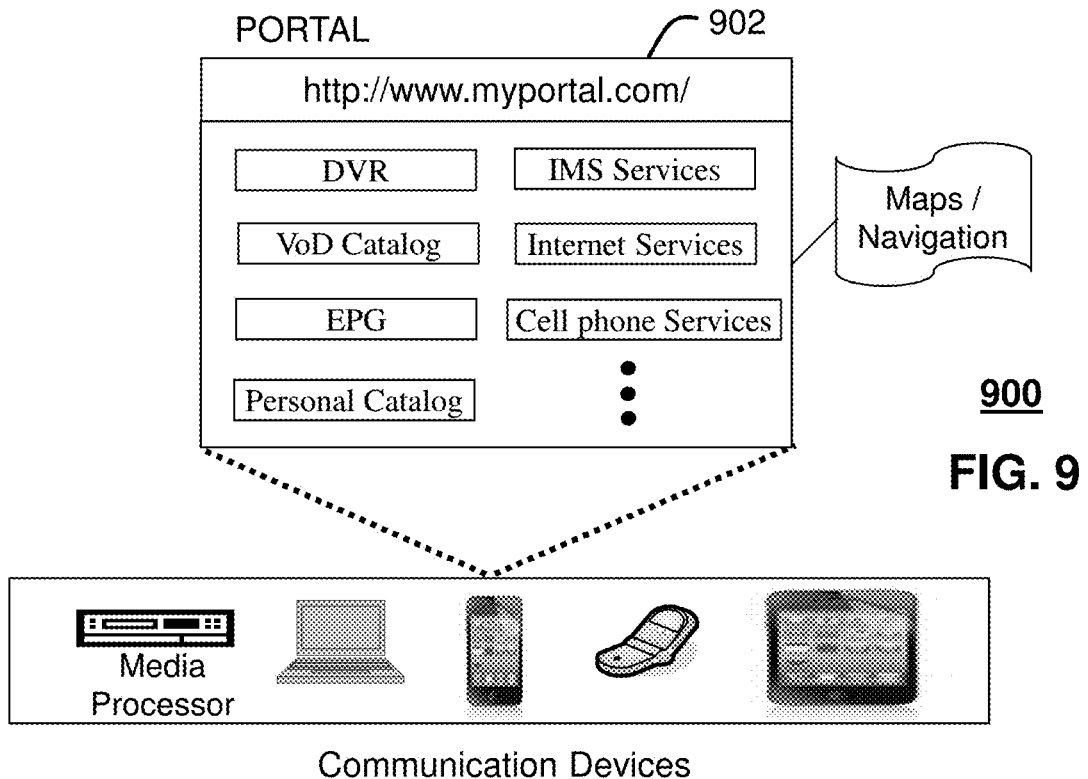
FIG. 9 depicts an illustrative embodiment of a web portal for interacting with the communication systems of FIGS. 7-8.

FIG. 9 depicts an illustrative embodiment of a web portal 902 of a communication system 900. Communication system 900 can be overlaid or operably coupled with system 100 of FIG. 1, communication system 700, and/or communication system 800 as another representative embodiment of system 100 of FIG. 1, communication system 700, and/or communication system 800. The web portal 902 can be used for managing services of system 100 of FIG. 1 and communication systems 700-800. A web page of the web portal 902 can be accessed by a Uniform Resource Locator (URL) with an Internet browser using an Internet-capable communication device such as those described in FIG. 2 and FIGS. 7-8. The web portal 902 can be configured, for example, to access a media processor 706 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 706. The web portal 902 can also be used for provisioning IMS services described earlier, provisioning Internet services, provisioning cellular phone services, and so on.

The web portal 902 can further be utilized to manage and provision software applications to adapt these applications as may be desired by subscribers and/or service providers of system 100 of FIG. 1, and communication systems 700-800. For instance, users of the services provided by server 202 or server 730 can log into their on-line accounts and provision the server 202 or server 730 with contact information to enable the server to communicate with devices described in FIGS. 2, 7, and 8, and so on. Service providers can log onto an administrator account to provision, monitor and/or maintain the system 200 of FIG. 2 or server 730.

Figure 10:
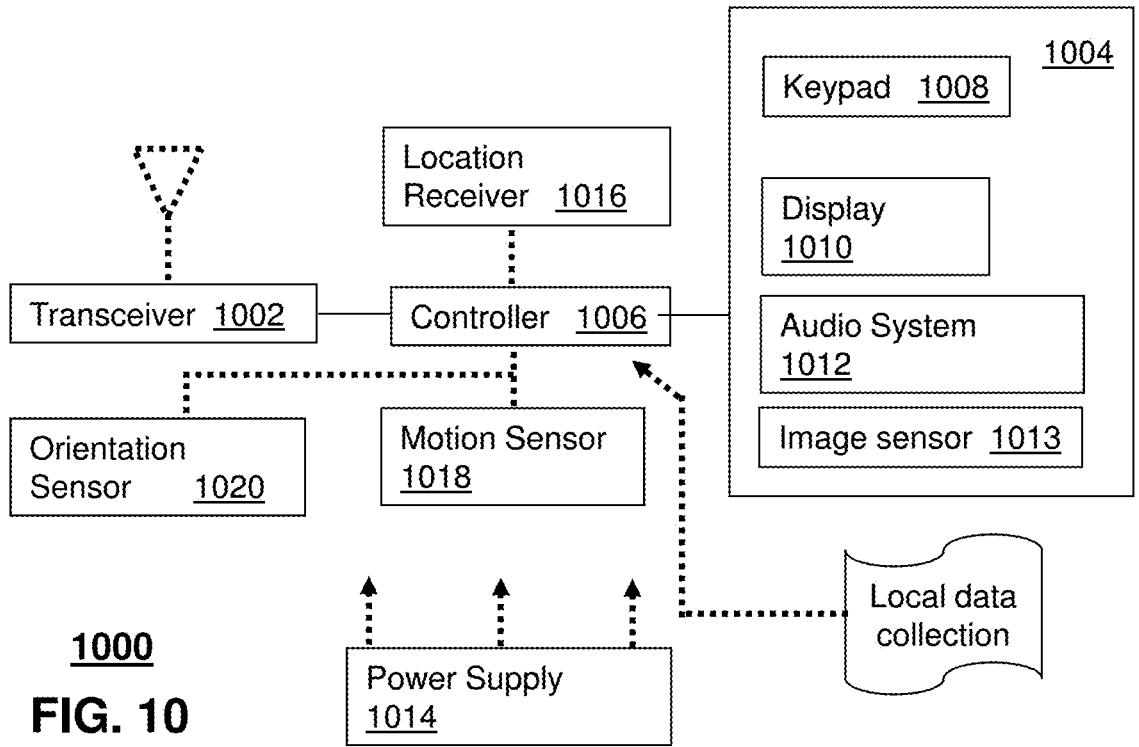
FIG. 10 depicts an illustrative embodiment of a communication device.

FIG. 10 depicts an illustrative embodiment of a communication device 1000. Communication device 1000 can serve in whole or in part as an illustrative embodiment of the devices depicted in FIG. 2 and FIGS. 7-8 and can be configured to perform portions of methods 300-600 of FIGS. 3-6.

Communication device 1000 can comprise a wireline and/or wireless transceiver 1002 (herein transceiver 1002), a user interface (UI) 1004, a power supply 1014, a location receiver 1016, a motion sensor 1018, an orientation sensor 1020, and a controller 1006 for managing operations thereof. The transceiver 1002 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1002 can also be adapted to support circuit-switched wireline access technologies (such as PSTN), packet-switched wireline access technologies (such as TCP/IP, VoIP, etc.), and combinations thereof.

The UI 1004 can include a depressible or touch-sensitive keypad 1008 with a navigation mechanism such as a roller ball, a joystick, a mouse, or a navigation disk for manipulating operations of the communication device 1000. The keypad 1008 can be an integral part of a housing assembly of the communication device 1000 or an independent device operably coupled thereto by a tethered wireline interface (such as a USB cable) or a wireless interface supporting for example Bluetooth®. The keypad 1008 can represent a numeric keypad commonly used by phones, and/or a QWERTY keypad with alphanumeric keys. The UI 1004 can further include a display 1010 such as monochrome or color LCD (Liquid Crystal Display), OLED (Organic Light Emitting Diode) or other suitable display technology for conveying images to an end user of the communication device 1000. In an embodiment where the display 1010 is touch-sensitive, a portion or all of the keypad 1008 can be presented by way of the display 1010 with navigation features.

The display 1010 can use touch screen technology to also serve as a user interface for detecting user input. As a touch screen display, the communication device 1000 can be adapted to present a user interface with graphical user interface (GUI) elements that can be selected by a user with a touch of a finger. The touch screen display 1010 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1010 can be an integral part of the housing assembly of the communication device 1000 or an independent device communicatively coupled thereto by a tethered wireline interface (such as a cable) or a wireless interface.

The UI 1004 can also include an audio system 1012 that utilizes audio technology for conveying low volume audio (such as audio heard in proximity of a human ear) and high volume audio (such as speakerphone for hands free operation). The audio system 1012 can further include a microphone for receiving audible signals of an end user. The audio system 1012 can also be used for voice recognition applications. The UI 1004 can further include an image sensor 1013 such as a charged coupled device (CCD) camera for capturing still or moving images.

The power supply 1014 can utilize common power management technologies such as replaceable and rechargeable batteries, supply regulation technologies, and/or charging system technologies for supplying energy to the components of the communication device 1000 to facilitate long-range or short-range portable applications. Alternatively, or in combination, the charging system can utilize external power sources such as DC power supplied over a physical interface such as a USB port or other suitable tethering technologies.

The location receiver 1016 can utilize location technology such as a global positioning system (GPS) receiver capable of assisted GPS for identifying a location of the communication device 1000 based on signals generated by a constellation of GPS satellites, which can be used for facilitating location services such as navigation. The motion sensor 1018 can utilize motion sensing technology such as an accelerometer, a gyroscope, or other suitable motion sensing technology to detect motion of the communication device 1000 in three-dimensional space. The orientation sensor 1020 can utilize orientation sensing technology such as a magnetometer to detect the orientation of the communication device 1000 (north, south, west, and east, as well as combined orientations in degrees, minutes, or other suitable orientation metrics).

The communication device 1000 can use the transceiver 1002 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1006 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1000.

Other components not shown in FIG. 10 can be used in one or more embodiments of the subject disclosure. For instance, the communication device 1000 can include a reset button (not shown). The reset button can be used to reset the controller 1006 of the communication device 1000. In yet another embodiment, the communication device 1000 can also include a factory default setting button positioned, for example, below a small hole in a housing assembly of the communication device 1000 to force the communication device 1000 to re-establish factory settings. In this embodiment, a user can use a protruding object such as a pen or paper clip tip to reach into the hole and depress the default setting button. The communication device 1000 can also include a slot for adding or removing an identity module such as a Subscriber Identity Module (SIM) card. SIM cards can be used for identifying subscriber services, executing programs, storing subscriber data, and so forth.

The communication device 1000 as described herein can operate with more or less of the circuit components shown in FIG. 10. These variant embodiments can be used in one or more embodiments of the subject disclosure.

The communication device 1000 can be adapted to perform the functions of devices shown in FIG. 2, the media processor 706, the media devices 708, or the portable communication devices 716 of FIG. 7, as well as the IMS CDs 801-802 and PSTN CDs 803-805 of FIG. 8. It will be appreciated that the communication device 1000 can also represent other devices that can operate in the system of FIG. 2 and communication systems 700-800 of FIGS. 7-8 such as a gaming console and a media player. In addition, the controller 1006 can be adapted in various embodiments to perform data indexing, data aggregation, map generation, and generation of navigation instructions.

Upon reviewing the aforementioned embodiments, it would be evident to an artisan with ordinary skill in the art that said embodiments can be modified, reduced, or enhanced without departing from the scope of the claims described below. For example, suggestions for improving performance of particular devices, based on flow models for those devices, can be stored in a database for use by a system administrator and thus applied to other devices on the network. Similarly, suggestions for improving quality of service on the network, based on generalized models for the network, can be stored in a database for application to different networks.

In additional embodiments, a system suggesting operation modifications for a network component (based on flow models and run-time flow information for that component) may implement software to permit the component to negotiate with the system regarding which modifications are to be applied. In a further embodiment, a service that uses intelligent caching (based on time or location) can be characterized. In another embodiment, a model for a service can be formulated to accommodate individual preferences of a service user.

In a further embodiment, a system operator can deliberately reshape flows (e.g. by limiting resources); the system will then adapt to the operator-defined shape without generating a network fault alarm. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 11:
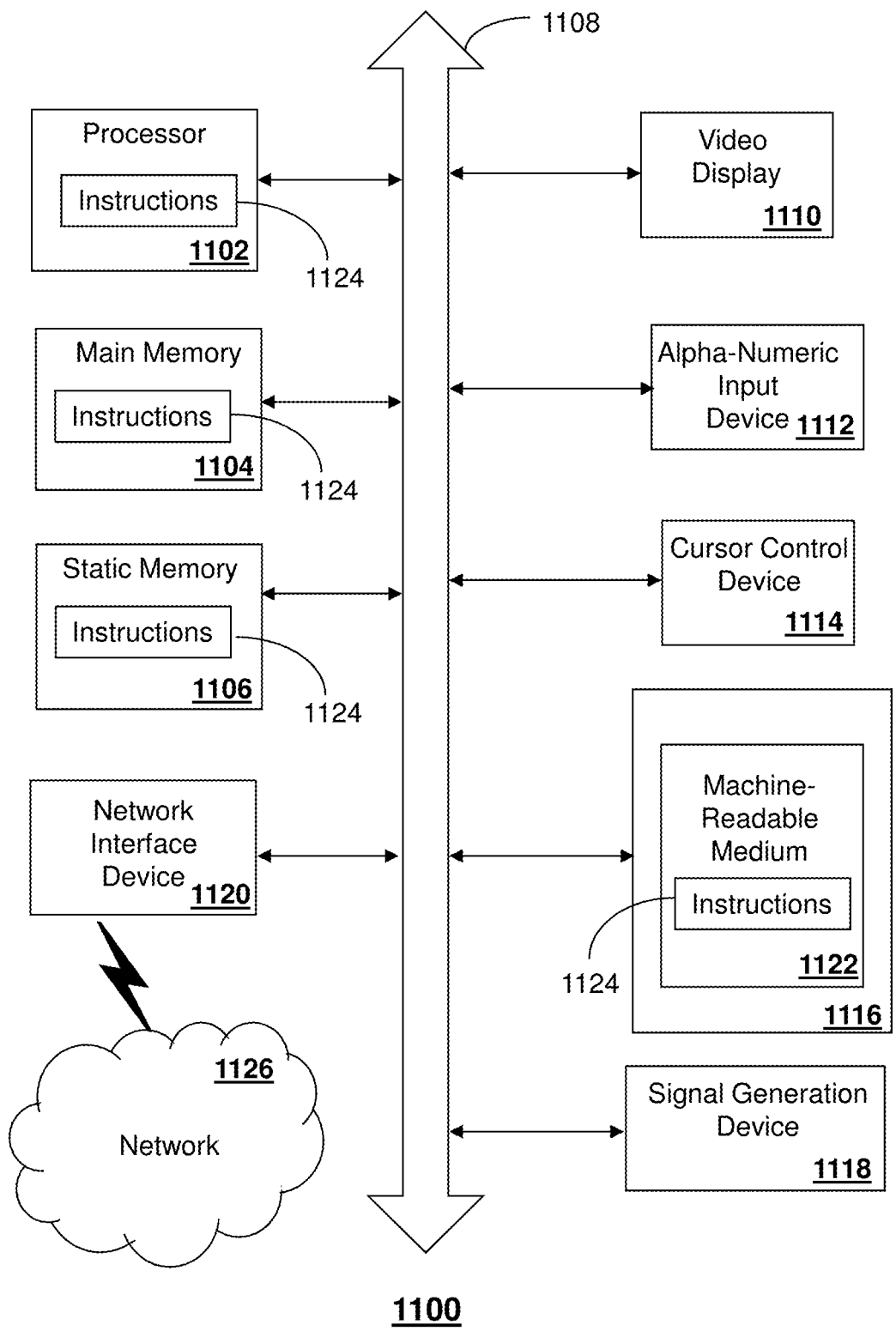
FIG. 11 is a diagrammatic representation of a machine in the form of a computer system within which a set of instructions, when executed, may cause the machine to perform any one or more of the methods described herein.

FIG. 11 depicts an exemplary diagrammatic representation of a machine in the form of a computer system 1100 within which a set of instructions, when executed, may cause the machine to perform any one or more of the methods described above. One or more instances of the machine can operate, for example, as the server 730, the media processor 706, the server 180, the database 190, and other devices of FIGS. 1-2. In some embodiments, the machine may be connected (e.g., using a network 1126) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1100 may include a processor (or controller) 1102 (e.g., a central processing unit (CPU)), a graphics processing unit (GPU, or both), a main memory 1104 and a static memory 1106, which communicate with each other via a bus 1108. The computer system 1100 may further include a display unit 1110 (e.g., a liquid crystal display (LCD), a flat panel, or a solid state display). The computer system 1100 may include an input device 1112 (e.g., a keyboard), a cursor control device 1114 (e.g., a mouse), a disk drive unit 1116, a signal generation device 1118 (e.g., a speaker or remote control) and a network interface device 1120. In distributed environments, the embodiments described in the subject disclosure can be adapted to utilize multiple display units 1110 controlled by two or more computer systems 1100. In this configuration, presentations described by the subject disclosure may in part be shown in a first of the display units 1110, while the remaining portion is presented in a second of the display units 1110.

The disk drive unit 1116 may include a tangible computer-readable storage medium 1122 on which is stored one or more sets of instructions (e.g., software 1124) embodying any one or more of the methods or functions described herein, including those methods illustrated above. The instructions 1124 may also reside, completely or at least partially, within the main memory 1104, the static memory 1106, and/or within the processor 1102 during execution thereof by the computer system 1100. The main memory 1104 and the processor 1102 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1122 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1100. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
obtaining, by a processing system including a processor, a first model for operation of a network component to be deployed on a communication network;
analyzing, by the processing system, the operation of the network component on the communication network according to the first model, prior to deployment of the network component on the communication network;
predicting, by the processing system, performance of the network component in accordance with the analyzing;
obtaining, by the processing system, flow statistics regarding a content flow in the communication network, wherein the communication network includes the network component deployed as a network node;
constructing, by the processing system, a second model of the content flow based on the flow statistics;
detecting, by the processing system, a quality of service for each of a plurality of network nodes on a content delivery path, wherein the plurality of network nodes on the content delivery path comprise the network component;
comparing, by the processing system, the detected quality of service with a predicted quality of service based on the second model; and
adjusting, by the processing system, the content flow on the content delivery path responsive to detection of a network anomaly based on the comparing, wherein the adjusting the content flow comprises modifying the content delivery path by start-up of a first device to add a first network node, shutdown of a second device to remove a second network node, or a combination thereof.

2. The method of claim 1, wherein the predicting is performed prior to the deployment of the network component.

3. The method of claim 1, wherein the first model is based on performance models for a plurality of components other than the network component.

4. The method of claim 1, wherein the communication network comprises the plurality of network nodes, the plurality of network nodes comprising devices, services, edge nodes, content sources, or a combination thereof.

5. The method of claim 1, wherein the network anomaly is detected in accordance with a network metric exceeding a threshold.

6. The method of claim 5, wherein the threshold is dynamically adjusted.

7. The method of claim 1, further comprising predicting, by the processing system, a repair for the network component to mitigate the network anomaly.

8. The method of claim 7, wherein the predicting the repair is performed prior to the deployment of the network component.

9. The method of claim 7, further comprising providing, by the processing system, to equipment of a user a suggestion regarding the predicted repair.

10. The method of claim 7, further comprising performing, by the processing system, a self-healing process including the repair.

11. A device comprising:
a processing system including a processor; and
a memory that stores executable instructions that, when executed by the processing system, facilitate performance of operations comprising:
obtaining a first model for operation of a network component to be deployed on a communication network;
analyzing the operation of the network component on the communication network according to the first model, prior to deployment of the network component on the communication network;
predicting, prior to deployment of the network component on the communication network, performance of the network component in accordance with the analyzing;
obtaining flow statistics regarding a content flow in the communication network, wherein the communication network includes the network component deployed as a network node;
constructing a second model of the content flow based on the flow statistics;
detecting a quality of service for each of a plurality of network nodes on a content delivery path, wherein the plurality of network nodes on the content delivery path comprise the network component;
comparing the detected quality of service with a predicted quality of service based on the second model; and
adjusting the content flow on the content delivery path responsive to detection of a network anomaly based on the comparing, wherein the adjusting the content flow comprises modifying the content delivery path.

12. The device of claim 11, wherein the modifying the content delivery path comprises a start-up of a first device to add a first network node, a shutdown of a second device to remove a second network node, or a combination thereof.

13. The device of claim 11, wherein the communication network comprises the plurality of network nodes, the plurality of network nodes comprising devices, services, edge nodes, content sources, or a combination thereof.

14. The device of claim 11, wherein the operations further comprise predicting a repair for the network component to mitigate the network anomaly.

15. The device of claim 14, wherein the operations further comprise performing a self-healing process including the repair.

16. A non-transitory machine-readable medium comprising executable instructions that, when executed by a processing system, facilitate performance of operations comprising:
obtaining a first model for operation of a network component to be deployed on a communication network;
analyzing the operation of the network component on the communication network according to the first model, prior to deployment of the network component on the communication network;
predicting performance of the network component in accordance with the analyzing;
obtaining flow statistics regarding a content flow in the communication network, wherein the communication network includes the network component deployed as a network node;
constructing a second model of the content flow based on the flow statistics;
detecting a quality of service for each of a plurality of network nodes on a content delivery path, wherein the plurality of network nodes on the content delivery path comprise the network component;
comparing the detected quality of service with a predicted quality of service based on the second model; and
adjusting the content flow on the content delivery path responsive to detection of a network anomaly based on the comparing, wherein the adjusting the content flow comprises modifying the content delivery path.

17. The non-transitory machine-readable medium of claim 16, wherein the predicting is performed prior to the deployment of the network component.

18. The non-transitory machine-readable medium of claim 16, wherein the modifying the content delivery path comprises a start-up of a first device to add a first network node, a shutdown of a second device to remove a second network node, or a combination thereof.

19. The non-transitory machine-readable medium of claim 16, wherein the communication network comprises the plurality of network nodes, the plurality of network nodes comprising devices, services, edge nodes, content sources, or a combination thereof.

20. The non-transitory machine-readable medium of claim 16, wherein the operations further comprise predicting a repair for the network component to mitigate the network anomaly.

* * * * *